United States Patent
Ren et al.

(10) Patent No.: US 9,209,702 B2
(45) Date of Patent: Dec. 8, 2015

(54) FLYBACK CONVERTER AND METHOD FOR CONTROLLING A FLYBACK CONVERTER

(71) Applicants: Zhimou Ren, Chengdu (CN); Yunning Xie, Chengdu (CN); Jun Ren, Chengdu (CN); Tiesheng Yan, Chengdu (CN)

(72) Inventors: Zhimou Ren, Chengdu (CN); Yunning Xie, Chengdu (CN); Jun Ren, Chengdu (CN); Tiesheng Yan, Chengdu (CN)

(73) Assignee: O2Micro Inc., Santa Clara, CA (US)

( * ) Notice: Subject to any disclaimer, the term of this patent is extended or adjusted under 35 U.S.C. 154(b) by 172 days.

(21) Appl. No.: 13/659,195

(22) Filed: Oct. 24, 2012

(65) Prior Publication Data
US 2014/0092647 A1    Apr. 3, 2014

(30) Foreign Application Priority Data
Sep. 28, 2012   (CN) .......................... 2012 1 0369123

(51) Int. Cl.
*H02M 3/335* (2006.01)
*H02M 1/00* (2007.01)

(52) U.S. Cl.
CPC .. *H02M 3/33553* (2013.01); *H02M 2001/0035* (2013.01); *Y02B 70/16* (2013.01)

(58) Field of Classification Search
CPC ........................... Y02B 70/16; H02M 3/33507
USPC ........................... 363/21.01–21.18, 37, 95, 97
See application file for complete search history.

(56) References Cited

U.S. PATENT DOCUMENTS

| 5,892,672 | A | 4/1999 | Preller |
| 7,035,119 | B2 * | 4/2006 | Koike .............................. 363/97 |
| 7,477,024 | B2 | 1/2009 | Lin et al. |
| 7,555,228 | B2 | 6/2009 | Ruegg et al. |
| 8,049,438 | B2 | 11/2011 | Liu et al. |
| 8,102,679 | B2 | 1/2012 | Gong et al. |
| 2009/0097289 | A1 | 4/2009 | Schetters |
| 2009/0316441 | A1 | 12/2009 | Hu |
| 2011/0122659 | A1 | 5/2011 | Duan et al. |

FOREIGN PATENT DOCUMENTS

| CN | 1456027 A | 11/2003 |
| CN | 1471214 A | 1/2004 |
| CN | 1905431 A | 1/2007 |
| CN | 101218737 A | 7/2008 |
| CN | 201307831 Y | 9/2009 |
| CN | 101657059 A | 2/2010 |
| CN | 202043321 U | 11/2011 |
| DE | 10146549 B9 | 11/2004 |
| WO | 9702648 A1 | 1/1997 |

* cited by examiner

*Primary Examiner* — Jeffrey Sterrett

(57) ABSTRACT

A flyback converter includes a transformer and a controller operable for controlling a switch coupled in series with a primary winding of the transformer. The controller is configured to operate in multiple modes including a burst mode and a standby mode. In the burst mode, the controller generates a first plurality of discrete pulse groups to turn on the switch and a duration of each pulse in the first plurality of discrete pulse groups is determined by a first reference signal having a first predetermined voltage. In the standby mode, the controller generates a second plurality of discrete pulse groups to turn on the switch and a duration of each pulse in the second plurality of discrete pulse groups is determined by a second reference signal having a second predetermined voltage which is greater than the first predetermined voltage of the first reference signal.

16 Claims, 9 Drawing Sheets

FLYBACK CONVERTER AND METHOD FOR CONTROLLING A FLYBACK CONVERTER

RELATED APPLICATION

This application claims priority to Chinese Patent Application No. 201210369123.3, titled "Flyback Converter, Controller and Method for Controlling Flyback Converter," filed on Sep. 28, 2012, with the State Intellectual Property Office of the People's Republic of China.

BACKGROUND

A flyback converter is a switch mode power supply circuit that can be used in applications such as AC-to-DC adapters and battery chargers and for converting an input power from a power source to an output power. Electrical equipment can have different loads under different operation modes. For example, if electrical equipment is in a power-saving mode (e.g., a sleep mode), only a few components of the equipment remain powered up and power consumption is relatively low. Thus, a flyback converter in the electric equipment may decrease output power. However, even in this power-saving mode, the control circuit of the flyback converter itself consumes some power.

SUMMARY

Embodiments in accordance with the present invention provide a flyback converter, a controller for controlling a flyback converter, and a method for operating a flyback converter.

In one embodiment, a flyback converter includes a transformer and a controller operable for controlling a switch coupled in series with a primary winding of the transformer. The controller is configured to operate in multiple modes including a burst mode and a standby mode. In the burst mode, the controller generates a first plurality of discrete pulse groups to turn on the switch and a duration of each pulse in the first plurality of discrete pulse groups is determined by a first reference signal having a first predetermined voltage. In the standby mode, the controller generates a second plurality of discrete pulse groups to turn on the switch and a duration of each pulse in the second plurality of discrete pulse groups is determined by a second reference signal having a second predetermined voltage which is greater than the first predetermined voltage of the first reference signal.

In another embodiment, a controller for controlling a flyback converter includes a first pin operable for receiving a feedback current indicating an output voltage of the flyback converter, a second pin operable for receiving a monitoring signal indicating a current flowing through a primary winding of a transformer in the flyback converter; and a third pin operable for outputting a drive signal to control a switch coupled in series with the primary winding. The drive signal is generated based on the feedback current and the monitoring signal. The controller is configured to operate in multiple modes including a burst mode and a standby mode. In the burst mode, the drive signal includes a first plurality of discrete pulse groups. In the standby mode, the drive signal includes a second plurality of discrete pulse groups. A duration of each pulse in the first plurality of discrete pulse groups is less than a duration of each pulse in the second plurality of discrete pulse groups.

In yet another embodiment, a method for controlling a flyback converter in a plurality of modes including a burst mode and a standby mode includes the steps of monitoring an output voltage of the flyback converter; monitoring a current flowing through a primary winding of a transformer in the flyback converter; and generating a drive signal to control a switch coupled in series with the primary winding based on a feedback current indicating the output voltage of the flyback converter and a monitoring signal indicating the current flowing through the primary winding. In the burst mode, the drive signal comprises a first plurality of discrete pulse groups. In the standby mode, the drive signal comprises a second plurality of discrete pulse groups. A duration of each pulse in the first plurality of discrete pulse groups is less than a duration of each pulse in the second plurality of discrete pulse groups.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide circuits and methods for controlling flyback converters that can be used to power various types of loads, for example, a light source.

Figure 1:
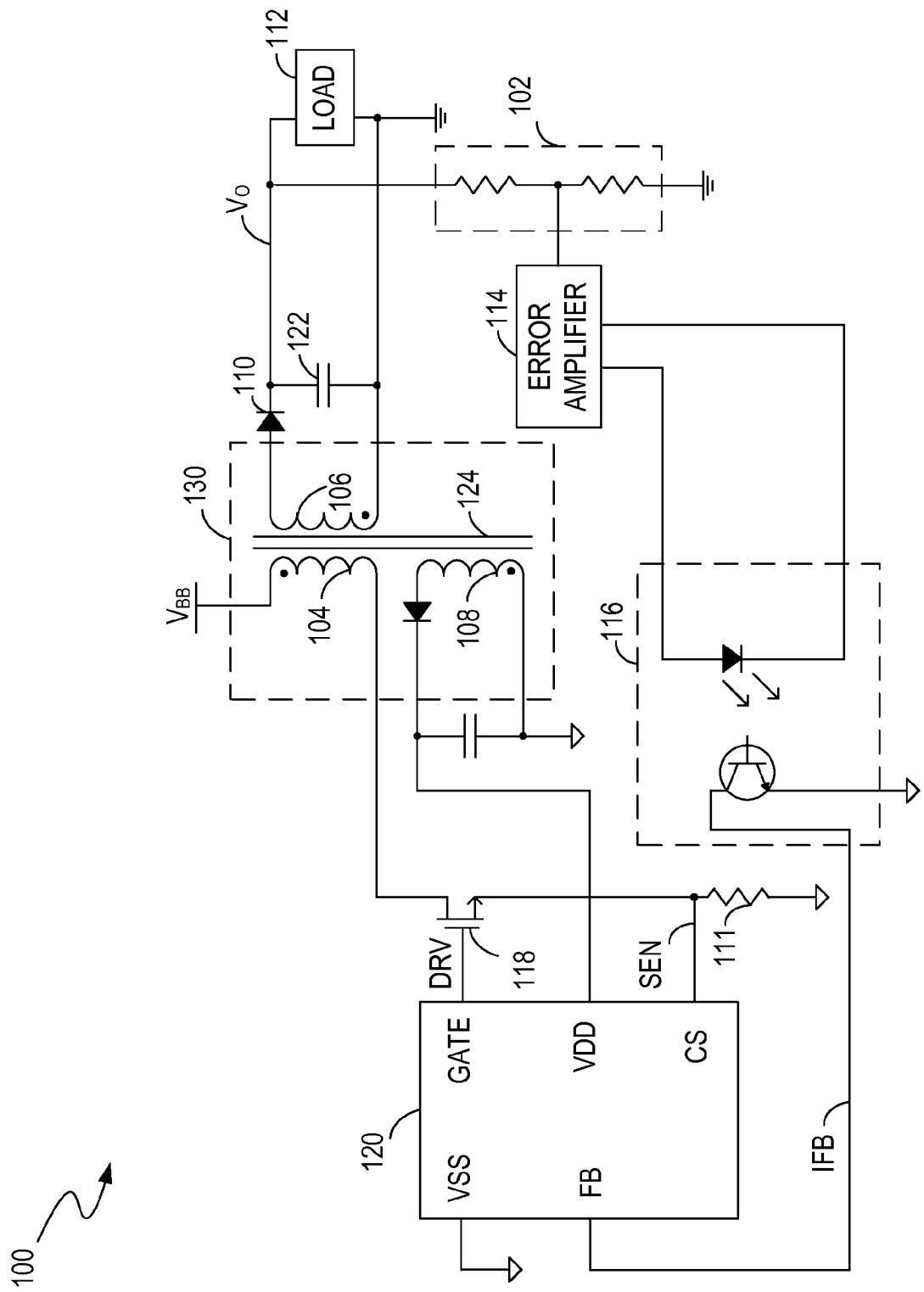
FIG. 1 shows a schematic diagram of a flyback converter, in an embodiment according to the present invention.

FIG. 1 shows a schematic diagram of a flyback converter 100, in an embodiment according to the present invention. The flyback converter 100 includes a controller 120, a transformer 130, a switch 118, a diode 110, and a capacitor 122. The transformer 130 includes a primary winding 104 coupled to a power source $V_{BB}$, a secondary winding 106 coupled to a load 112, and an auxiliary winding 108. The switch 118 is coupled in series with the primary winding 104. The diode 110 is coupled in series with the secondary winding 106. The capacitor 122 is coupled in parallel with the secondary winding 106. If the switch 118 is turned on by the controller 120, a current flows through the primary winding 104 and energy is stored in a magnetic core 124 of the transformer 130. When the switch 118 is turned off by the controller 120, the diode 110 coupled to the secondary winding 106 is forward-biased, and thus the energy stored in the magnetic core 124 is released through the secondary winding 106 to a capacitor 122 and the load 112. An error amplifier 114 monitors the output voltage $V_O$ of the flyback converter 100 through a voltage divider 102, and controls an optical coupler 116 to generate a feedback current IFB which indicates the output voltage $V_O$. A current sensor 111 coupled in series with the switch 118 and the primary winding 104 provides a monitoring signal SEN which indicates a current flowing through the primary winding 104. The controller 120 generates a drive signal DRV based on the feedback current IFB and also based on the monitoring signal SEN to control the switch 118 thus to adjust the output voltage $V_O$. The variation of the load 112 can affect the output voltage $V_O$. If the load 112 decreases, the output voltage $V_O$ intends to increase, and the feedback signal IFB generated by the optical coupler 116 increases under control of the error amplifier 114. If the load 112 increases, then the output voltage $V_O$ intends to decrease, and the feedback signal IFB generated by the optical coupler 116 decreases under control of the error amplifier 114.

The pins of the controller 120 include VSS, FB, GATE, VDD, and CS. The pin VSS is coupled to ground, the pin FB receives the feedback current IFB, the pin GATE outputs the drive signal DRV, the pin VDD is coupled to the auxiliary winding 108 and provides power to the controller 120, and the pin CS receives the monitoring signal SEN which indicates a current flowing through the primary winding 104. According to the feedback current IFB received at the FB pin, the controller 120 may operate in different modes including a pulse width modulation (PWM) mode, a pulse frequency modulation (PFM) mode, a burst mode, and a standby mode. The drive signal DRV may have different waveforms in different modes.

Figure 2:
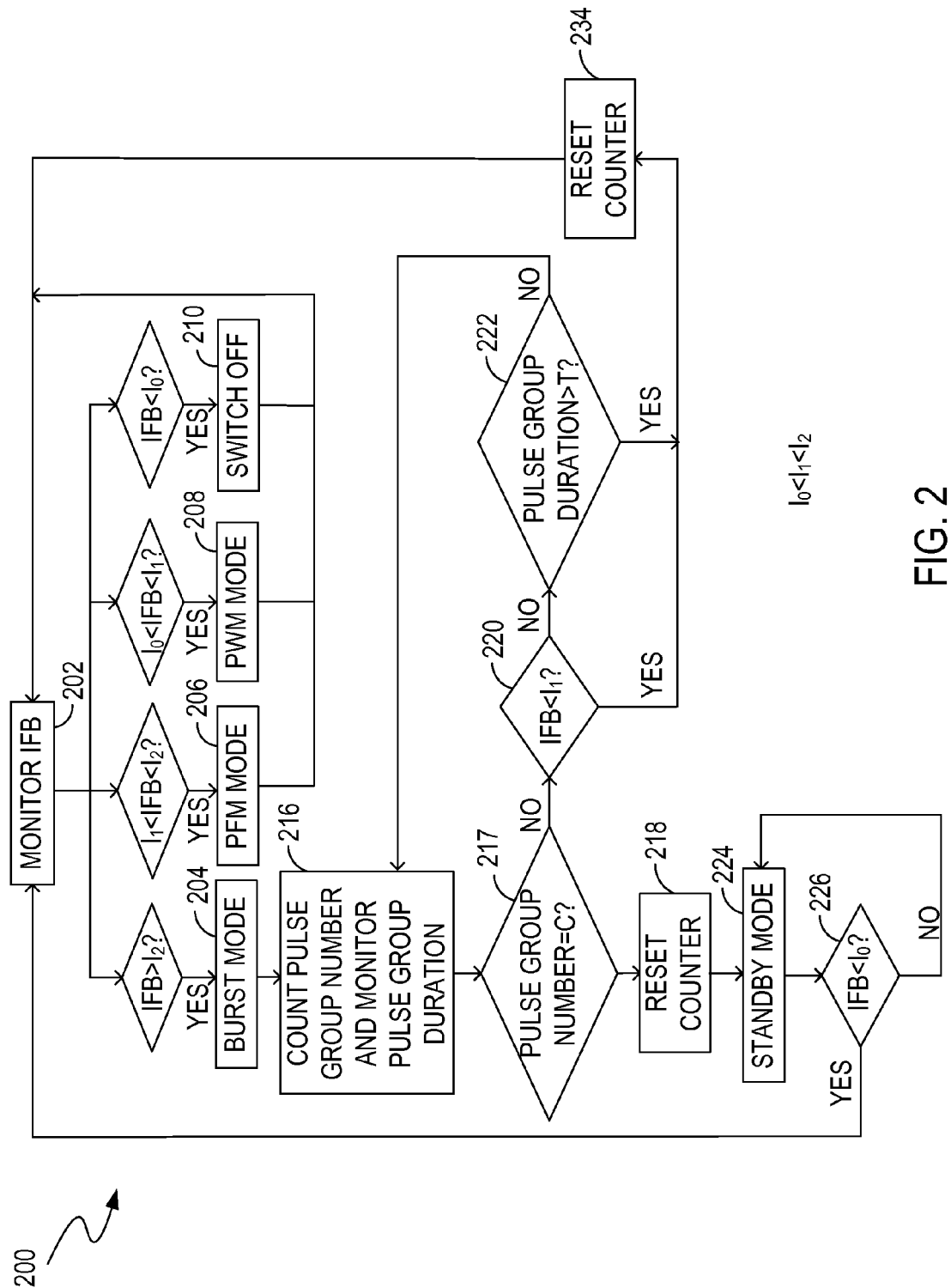
FIG. 2 shows a flowchart of a method for controlling a flyback converter, in an embodiment according to the present invention.

FIG. 2 shows a flowchart 200 of a method for controlling a flyback converter, in an embodiment according to the present invention. The flowchart 200 illustrates conditions for the controller 120 to transit from one mode to another and is described in combination with FIG. 1. The controller 120 compares the feedback current IFB with multiple thresholds $I_0$, $I_1$, and $I_2$ ($I_0 < I_1 < I_2$) to choose an operation mode.

In step 202, the controller 120 monitors the feedback current IFB. If IFB is less than $I_0$, then the controller 120 keeps the switch 118 off, step 210. If IFB is less than $I_1$ and greater than $I_0$, then the controller 120 enters the PWM mode, step 208. In the PWM mode, the controller 120 continues monitoring the feedback current IFB. If IFB increases (e.g., because the load 112 decreases) and IFB is greater than $I_1$ and less than $I_2$, then the controller 120 enters the PFM mode, step 206. In the PFM mode, if IFB increases above $I_2$, then the controller 120 enters the burst mode, step 204.

In the burst mode, the controller 120 generates the drive signal DRV that includes multiple discrete pulse groups. Each of the pulse groups includes multiple pulses (shown in FIG. 7). In step 216, the controller 120 counts the number of the pulse groups by a counter, and monitors the duration of each pulse group. In step 217, the controller 120 checks the count value of the counter to determine whether the number of the pulse groups is increased to a predetermined number C. If yes, the controller 120 resets the count value to an initial value (e.g., 0), step 218, then the flowchart 200 goes to step 224 and the controller 120 enters the standby mode. Otherwise, the flowchart 200 goes from step 217 to step 220 to determine if the feedback current IFB is less than $I_1$. If yes, the flowchart 200 goes to step 234 to reset the count value to the initial value, and then returns to step 202. If IFB is not less than $I_1$, then the flowchart 200 goes to step 222. In step 222, if the duration of one of the pulse group is greater than a predetermined time T, then the flowchart 200 goes to step 234 to reset the count value to the initial value and then returns to step 202. Otherwise, the flowchart 200 returns to step 216 to continue counting the number of pulse groups.

Refer back to step 224. In the standby mode, the controller 120 compares the feedback current IFB with the threshold $I_0$, step 226. If IFB is less than $I_0$, the flowchart 200 returns to step 202. Otherwise, the controller 120 remains in the standby mode. The burst mode and the standby mode will be described in detail in FIGS. 6-9.

Figure 3:
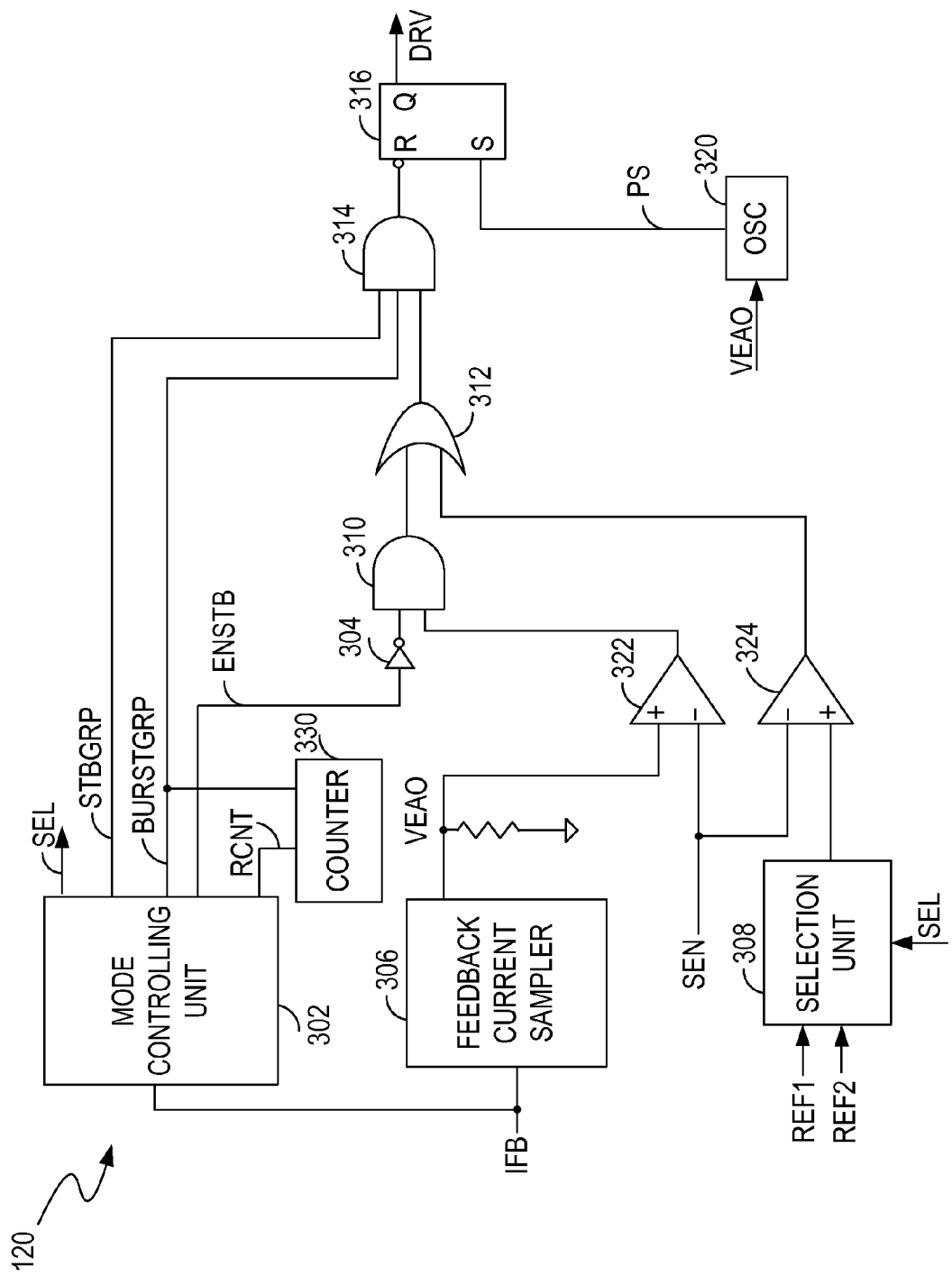
FIG. 3 shows an example of a controller, in an embodiment according to the present invention.

FIG. 3 shows an example of a controller 120 in FIG. 1, in an embodiment according to the present invention. The controller 120 includes a mode controlling unit 302, a feedback current sampler 306, a counter 330, a selection unit 308, a comparator 322, a comparator 324, an inverter 304, an AND gate 310, an OR gate 312, an AND gate 314, an RS flip-flop 316, and an oscillator 320. The controller 120 compares the feedback current IFB with multiple thresholds to select an operation mode from a PWM mode, a PFM mode, a burst mode, and a standby mode. The mode controlling unit 302 generates a selection signal SEL, a burst mode pulse group outline signal BURSTGRP, a standby mode pulse group outline signal STBGRP, a counter reset signal RCNT, and a standby mode indication signal ENSTB. The counter 330 counts the rising edges in the burst mode pulse group outline signal BURSTGRP and can be reset by the reset signal RCNT. The feedback current sampler 306 generates a voltage signal VEAO based on the feedback current IFB. The voltage of VEAO is inversely proportional to the current of IFB. The comparator 322 compares the voltage signal VEAO with the monitoring signal SEN which indicates a current flowing through the primary winding 104. The selection unit 308 selectively outputs a first reference signal REF1 or a second reference signal REF2 to the comparator 324 based on the selection signal SEL. The first reference signal REF1 has a first predetermined voltage. The second reference signal REF2 has a second predetermined voltage. The first reference signal REF1 and the second reference signal REF2 are configured in such a way that the first reference signal REF1 is less than the second reference signal REF2. The first reference signal REF1 is less than the voltage signal VEAO when the controller 120 is in the PWM mode and the PFM mode. The first reference signal REF1 is greater than the voltage signal VEAO when the controller 120 is in the burst mode and in the standby mode. The comparator 324 compares the output of the selection unit 308 with the monitoring signal SEN. The inverter 304 receives the standby mode indication signal ENSTB and outputs an inverted signal. The AND gate 310 performs an AND operation on the output of the inverter 304 and the output of the comparator 322. The OR gate 312 performs an OR operation on the output of the AND gate 310 and the output of the comparator 324. The AND gate 314 performs an AND operation on the output of the OR gate 312, the burst mode pulse group outline signal BURSTGRP, and the standby mode pulse group outline signal STBGRP. The oscillator 320 receives the voltage signal VEAO and generates a pulse signal PS. The RS flip-flop 316 receives the output of the AND gate 314 at an R terminal, receives the pulse signal PS at an S terminal, and outputs the drive signal DRV at a Q terminal to control the switch 118.

Figure 4:
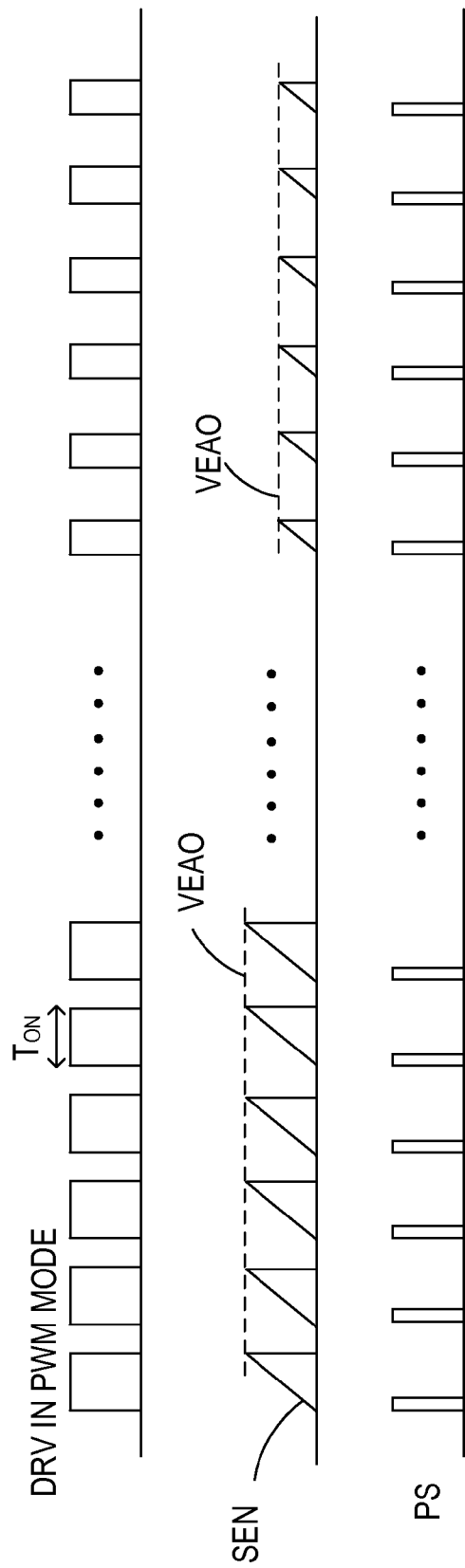
FIG. 4 shows waveforms of signals associated with the controller in pulse width modulation (PWM) mode, in an embodiment according to the present invention.

FIG. 4 shows waveforms of signals associated with the controller 120 in FIG. 1 in a PWM mode, in an embodiment according to the present invention. FIG. 4 is described in combination with FIG. 3. If the feedback current IFB is greater than the threshold $I_0$ and less than the threshold $I_1$, then the controller 120 enters the PWM mode. In the PWM mode, the mode controller unit 302 sets BURSTGRP to be logic high, STBGRP to be logic high, ENSTB to be logic low, and RCNT to be logic low. The selection unit 308 outputs the first reference signal REF1. The oscillator 320 outputs the pulse signal PS with a predetermined frequency to the S terminal of the RS flip-flop 316. The RS flip-flop 316 outputs logic high (e.g., the drive signal DRV is set to be logic high) in response to each pulse in the pulse signal PS to turn on the switch 118. As such, a current flows from the power source $V_{BB}$ through the primary winding 104 and the switch 118 to ground, and the voltage of the monitoring signal SEN gradually increases.

In the PWM mode, the first reference signal REF1 is less than the voltage signal VEAO. If the monitoring signal SEN is less than the first reference signal REF1, then the monitoring signal SEN is also less than the voltage signal VEAO. The comparator 322 and the comparator 324 both output logic high, the AND gate 310 outputs logic high, the OR gate 312 outputs logic high, the AND gate 314 output logic high, the RS flip-flop 316 outputs logic high (e.g., the drive signal DRV is logic high), the switch 118 is turned on, and the current flowing through the primary winding 104 increases such that the monitoring signal SEN increases.

If the monitoring signal SEN increases to greater than the first reference signal REF1 and less than that of the voltage signal VEAO, then the comparator 324 outputs logic low, the comparator 322 outputs logic high, the AND gate 310 outputs logic high, the OR gate 312 outputs logic high, the AND gate 314 output logic high, the RS flip-flop 316 outputs logic high (e.g., the drive signal DRV is logic high), and the switch 118 remains on.

If the monitoring signal SEN increases to greater than the voltage signal VEAO, then the comparator 324 outputs logic low, the comparator 322 outputs logic low, the AND gate 310 outputs logic low, the OR gate 312 outputs logic low, the AND gate 314 output logic low, the RS flip-flop 316 outputs logic low (e.g., the drive signal DRV is logic low), and the switch 118 is turned off. The switch 118 remains off until the S terminal of the RS flip-flop 316 receives a pulse generated by the oscillator 320 such that the drive signal DRV turns to logic high and the switch 118 is turned on again.

As described above, the switch 118 is turned on according to the pulse signal PS generated by the oscillator 320. The switch 118 is turned off according to the voltage of the voltage signal VEAO. As shown in FIG. 4 as an example, if the load 112 decreases, the feedback current IFB increases, and the voltage signal VEAO decreases, then the time period $T_{ON}$ when the drive signal DRV is logic high (e.g., the ON time of the switch 118) is decreased. If the load 112 continues decreasing such that the feedback IFB increases to be greater than $I_1$ and less than $I_2$, then the controller 120 enters the PFM mode.

Figure 5:
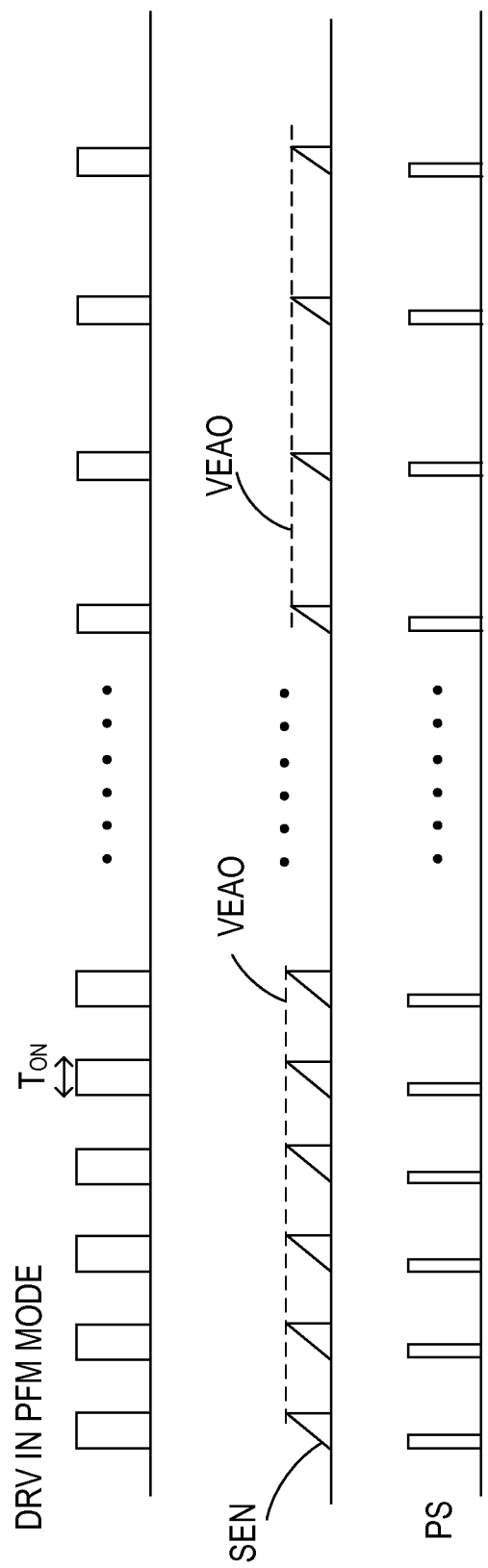
FIG. 5 shows waveforms of signals associated with a controller in pulse frequency modulation (PFM) mode, in an embodiment according to the present invention.

FIG. 5 shows waveforms of signals associated with the controller in FIG. 1 in the PFM mode, in an embodiment according to the present invention. In the PFM mode, the mode controller unit 302 sets BURSTGRP to be logic high, STBGRP to be logic high, ENSTB to be logic low, and RCNT to be logic low. The selection unit 308 outputs the first reference signal REF1. If the load 112 decreases, then the feedback current IFB increases, and the voltage signal VEAO decreases. In the PFM mode, the frequency of the pulse signal PS generated by the oscillator 320 decreases if the voltage signal VEAO decreases, and therefore the frequency for the switch 118 to turn on is decreased. In the PFM mode, the frequency of the pulse signal PS can be decreased until it reaches a predetermined minimum frequency $F_{MIN}$. Meanwhile, similar to the PWM mode, as the voltage signal VEAO decreases, the time period $T_{ON}$ when the drive signal DRV is logic high is further decreased. If the feedback current IFB increases above the threshold $I_2$ due to the decrease of the load 112, then the controller 120 enters the burst mode.

Figure 6:
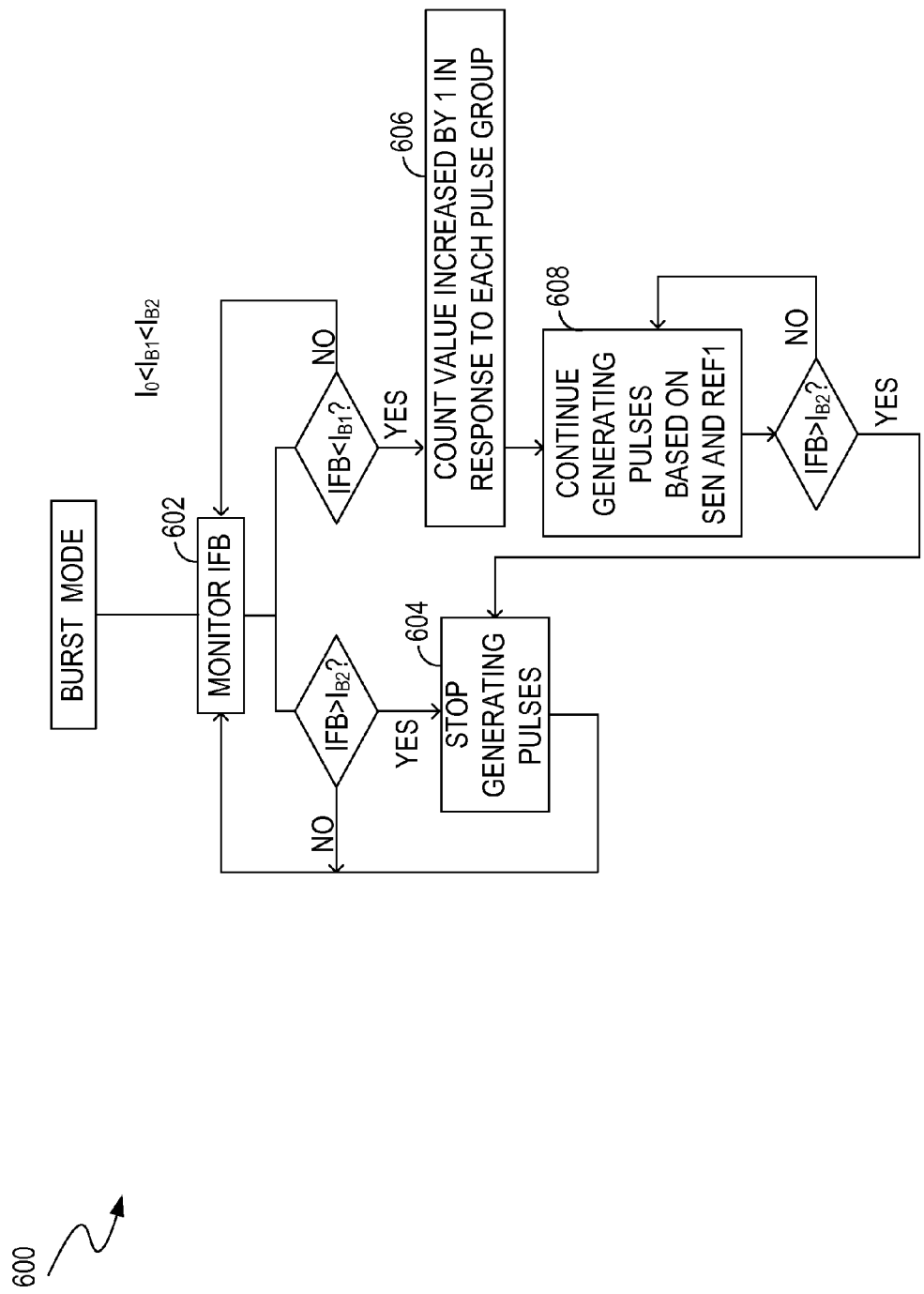
FIG. 6 shows a flowchart of operations of a controller in a burst mode, in an embodiment according to the present invention.
Figure 7:
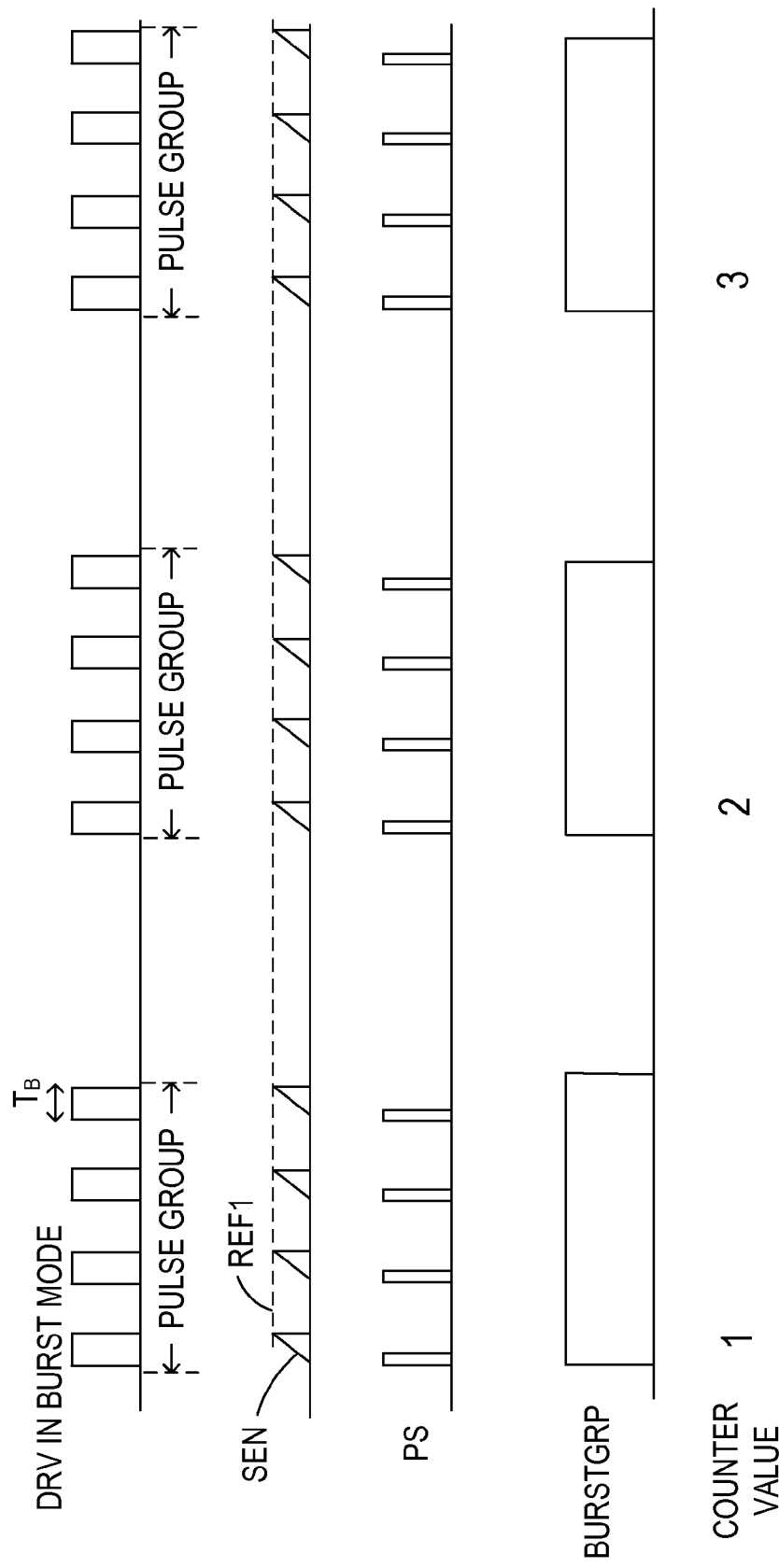
FIG. 7 shows waveforms of signals associated with a controller in a burst mode, in an embodiment according to the present invention.

FIG. 6 shows a flowchart 600 of operations of the controller 120 in the burst mode, in an embodiment according to the present invention. FIG. 7 shows waveforms 700 of signals associated with the controller 120 in the burst mode, in an embodiment according to the present invention. FIG. 6 is described in combination with FIG. 7. In the burst mode, the selection unit 308 selectively outputs the first reference signal REF1, and the oscillator 320 generates the pulse signal PS with the predetermined minimum frequency $F_{MIN}$. The mode controller unit 302 sets STBGRP to be logic high and sets ENSTB to be logic low. The status of BURSTGRP is determined by the mode controlling unit 302 based on the feedback current IFB. Refer to FIG. 6. In step 602, the mode controlling unit 302 monitors the feedback current IFB. If the feedback current IFB is less than a threshold $I_{B1}$, then the flowchart 600 goes to step 606 to increase the count value of the counter 330 by one (1) in response to each pulse group in the drive signal DRV. More specifically, the mode controlling unit 302 sets BURSTGRP to be logic high to enable the RS flip-flop 316 to output pulses. The count value of the counter 330 is increased by 1 in response to a rising edge of BURSTGRP, and then the flowchart 600 goes to step 608.

In step 608, the controller 120 compares the monitoring signal SEN with the first reference signal REF1 to generate multiple pulses in the drive signal DRV. The multiple pulses constitute a pulse group, as shown in FIG. 7. More specifically, in the burst mode, the first reference signal REF1 is greater than the voltage signal VEAO. If the monitoring signal SEN is less than the voltage signal VEAO, then the monitoring signal SEN is also less than the first reference signal REF1, and therefore, referring to FIG. 3, the comparator 322 and the comparator 324 both output logic high, the AND gate 310 outputs logic high, the OR gate 312 outputs logic high, the AND gate 314 output logics high, the RS flip-flop 316 output logic high (e.g., the drive signal DRV is logic high), the switch 118 is on, and the current flowing through the primary winding 104 increases such that the monitoring signal SEN increases.

If the monitoring signal SEN increases to greater than the voltage signal VEAO and less than the first reference signal REF1, the comparator 322 outputs logic low, the comparator 324 outputs logic high, the AND gate 310 outputs logic low, the OR gate 312 outputs logic high, the AND gate 314 output logics high, the RS flip-flop 316 output logic high (e.g., the drive signal DRV is logic high), and the switch 118 remains on.

If the monitoring signal SEN increases to greater than the first reference signal REF1, the comparator 322 outputs logic low, the comparator 324 outputs logic low, the AND gate 310 outputs logic low, the OR gate 312 outputs logic low, the AND gate 314 output logics low, the RS flip-flop 316 output logic low (e.g., the drive signal DRV is logic low), and the switch 118 is turned off. The switch 118 remains off until the S terminal of the RS flip-flop 316 receives a pulse generated by the oscillator 320 such that the drive signal DRV turns to logic high and the switch 118 is turned on again. As such, in the burst mode, the voltage of the first reference signal REF1 determines the time period $T_B$ when the drive signal DRV is logic high (e.g., the duration of each pulse in the multiple discrete pulse groups).

As described above, if the feedback current IFB is less than the threshold $I_{B1}$, the switch 118 is turned on again and off again in response to the pulses in the drive signal DRV. If the feedback current IFB increases to be greater than a threshold IB2 ($I_0<I_{B1}<I_{B2}$), then the mode controlling unit 302 sets BURSTGRP to be logic low, and the flowchart 600 goes to step 604 to stop generating pulses in the drive signal DRV. More specifically, referring to FIG. 3, if BURSTGRP is logic low, then the AND gate 314 outputs logic low to the R terminal of the RS flip-flop 316, the drive signal DRV remains at logic low, and thus the pulse generation in the drive signal DRV is stopped, and the switch 118 is turned off. Then, the flowchart 600 goes to step 602 and the mode controlling unit 302 continues monitoring the feedback current IFB. If IFB decreases below the threshold $I_{B1}$, then the mode controlling unit 302 sets BURSTGRP to be logic high. The count value of the counter 330 is increased by 1 in response to the rising edge of BURSTGRP, and the controller 120 starts generating another pulse group in the drive signal DRV.

On the other hand, as shown in FIG. 2, in the burst mode, if the count value of the counter 330 increases to the predetermined value C, it indicates that the controller 120 has continuously generated C pulse groups. As a result, the mode controlling unit 302 changes RCNT from logic low to logic high. The counter 330 is reset, and the controller 120 enters the standby mode. In the burst mode, if the feedback current IFB decreases below the threshold $I_1$, or a duration of a pulse group is greater than the predetermined time T, then the controller 120 exits the burst mode, resets the counter 330, and selects an operation mode again based on the feedback current IFB.

Figure 8:
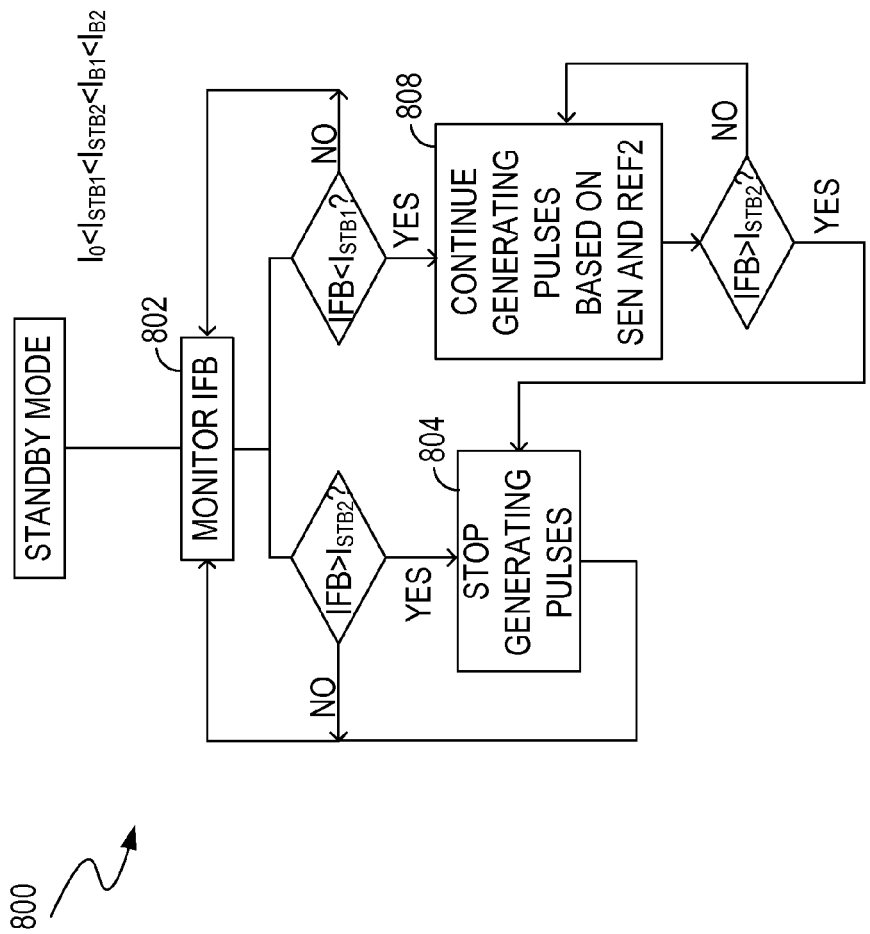
FIG. 8 shows a flowchart of operations of a controller in a standby mode, in an embodiment according to the present invention.
Figure 9:
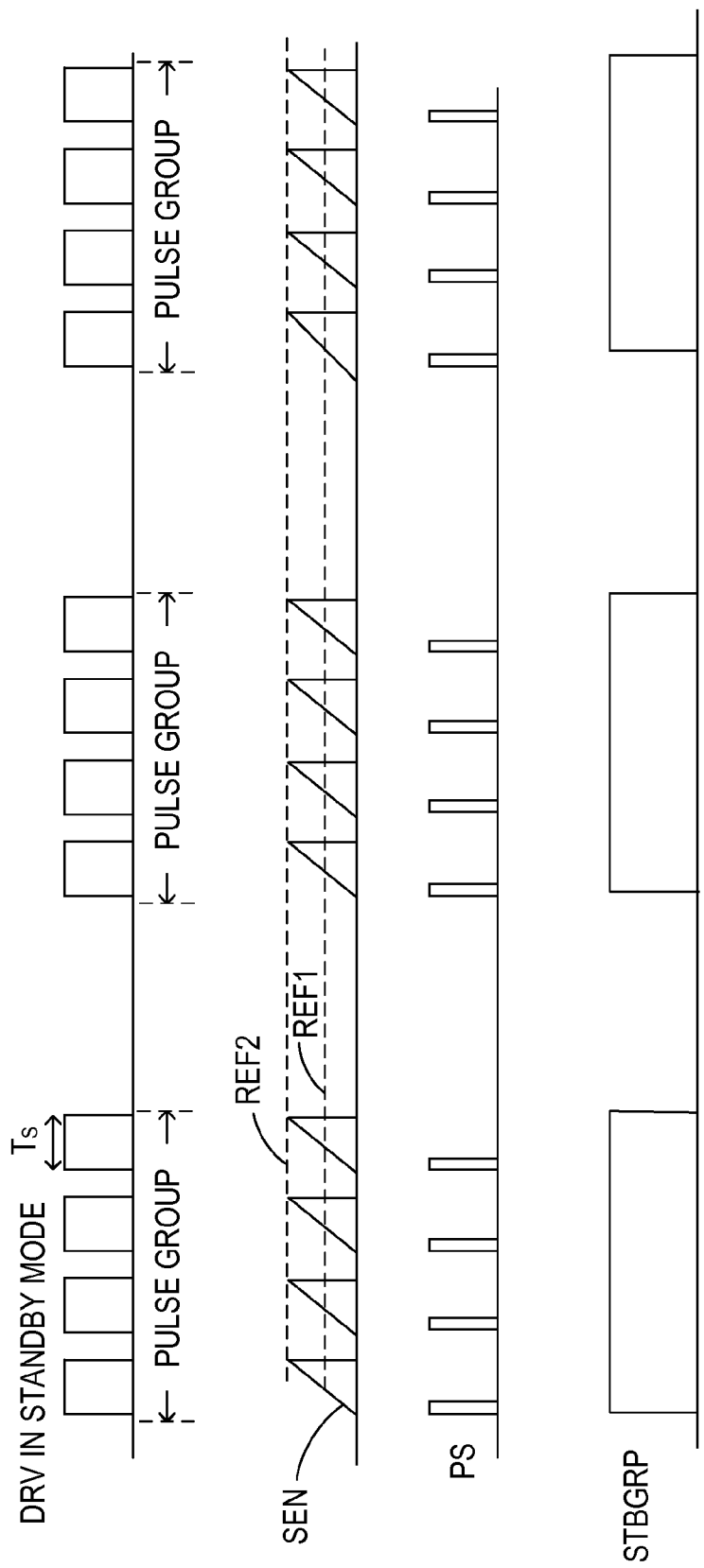
FIG. 9 shows waveforms of signals associated with a controller in a standby mode, in an embodiment according to the present invention.

FIG. 8 shows a flowchart 800 of operations of the controller 120 in a standby mode, in an embodiment according to the present invention. FIG. 9 shows waveforms of signals associated with the controller 120 in the standby mode, in an embodiment according to the present invention. FIG. 8 is described in combination with FIG. 9. In the standby mode, the controller 120 generates the drive signal DRV that includes multiple discrete pulse groups, and each of the pulse groups includes multiple pulses (shown in FIG. 9).

In the standby mode, the oscillator 320 generates the pulse signal PS with the predetermined minimum frequency $F_{MIN}$. The mode controller unit 302 sets BURSTGRP to be logic high, sets ENSTB to be logic high, and sets RCNT to be logic low. The status of STBGRP is determined by the mode controlling unit 302 based on the feedback current IFB. The selection unit 308 selectively outputs the second reference signal REF2, which is greater than the first reference signal REF1. In step 802, the mode controlling unit 302 monitors the feedback current IFB. If the feedback current IFB is less than a threshold $I_{STB1}$, then the flowchart 800 goes to step 808. In step 808, the mode controlling unit 302 sets STBGRP to be logic high, and the controlling unit 120 compares the monitoring signal SEN with the second reference signal REF2 to generate multiple pulses in the drive signal DRV. The multiple pulses constitute a pulse group, as shown in FIG. 9. More specifically, the AND gate 310 outputs logic low because ENSTB is logic high. If the monitoring signal SEN is less than the second reference signal REF2, the comparator 324 outputs logic high, the OR gate 312 outputs logic high, the AND gate 314 outputs logic low, the RS flip-flop 316 output logic high (e.g., the drive signal DRV is logic high), the switch 118 is on, and the current flowing through the primary winding 104 increases such that the monitoring signal SEN increases. If the monitoring signal SEN increases to greater than the second reference signal REF2, the comparator 324 outputs logic low, the AND gate 310 outputs logic low, the OR gate 312 outputs logic low, the AND gate 314 outputs logic low, the RS flip-flop 316 outputs logic low (e.g., the drive signal DRV is logic low), and the switch 118 is off. The switch 118 remains off until the S terminal of the RS flip-flop 316 receives a pulse generated by the oscillator 320 such that the drive signal DRV turns to logic high and the switch 118 is turned on again. As such, in the standby mode, the voltage of the second reference signal REF2 determines the time period $T_S$ when the drive signal DRV is logic high (e.g., the duration of each pulse in the multiple discrete pulse groups).

As described above, if the feedback current IFB is less than the threshold $I_{STB1}$, then the switch 118 is turned on again and off again in response to the pulses in the drive signal DRV. If the feedback current IFB increases to greater than a threshold $I_{STB2}$ ($I_0<I_{STB1}<I_{STB2}<I_{B1}<I_{B2}$), then the mode controlling unit 302 sets STBGRP to be logic low, and the flowchart 800 goes to step 804 to stop generating pulses in the drive signal DRV. More specifically, referring to FIG. 3, if STBGRP is logic low, then the AND gate 314 outputs logic low to the R terminal of the RS flip-flop 316, and the drive signal DRV remains at logic low; thus, the pulse generation in the drive signal DRV is stopped, and the switch 118 is turned off. Then, the flowchart 800 goes to step 802 and the mode controlling unit 302 continues monitoring the feedback current IFB. If IFB decreases below the threshold $I_{STB1}$, then the mode controlling unit 302 sets STBGRP to logic high. The controller 120 starts generating another pulse group in the drive signal DRV.

On the other hand, as shown in FIG. 2, in the standby mode, if the feedback current IFB decreases below the threshold $I_0$, then the mode controlling unit 302 sets ENSTB to logic low, and the controller 120 exits the standby mode and selects an operation mode again based on the feedback current IFB.

The present invention discloses circuits and methods for controlling a flyback converter. The circuits and methods of the present invention dynamically change operation modes according to changes to the load, such that the flyback converter can provide a proper output power for the load.

In the burst mode, if the load continues decreasing, then the controller 120 enters the standby mode. The voltage of the second reference signal REF2 selected by the selection unit 308 in the standby mode is greater than the voltage of the first reference signal REF1 selected by the selection unit 308 in the burst mode. Therefore, in the standby mode, a duration $T_S$ of each pulse in the drive signal DRV is greater than a duration $T_B$ of each pulse in the drive signal DRV when the controller 120 is in the burst mode. Advantageously, in the standby mode, the switching frequency of the switch 118 is decreased and thereby the switching loss is decreased. Furthermore, in the standby mode, the drive signal DRV is generated by comparing the feedback current IFB with the threshold $I_{STB1}$ and $I_{STB2}$. On the other hand, the feedback current IFB is affected by the drive signal DRV via a feedback loop, and therefore is controlled in turn by the thresholds $I_{STB1}$ and $I_{STB2}$. Similarly, in the burst mode, the feedback current IFB is controlled by the thresholds $I_{B1}$ and $I_{B2}$. Because $I_{STB1} < I_{STB2} < I_{B1} < I_{B2}$, the feedback current IFB in the standby mode is generally less than the feedback current IFB in the burst mode. Consequently, in the standby mode, the control circuit of the flyback converter itself consumes less power, and the power efficiency is further improved.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A flyback converter, comprising:
    a transformer having a primary winding coupled to a power source; and
    a controller operable for controlling a switch coupled in series with said primary winding,
    wherein said controller is configured to operate in a plurality modes comprising a burst mode and a standby mode,
    wherein in said burst mode, said controller generates a first plurality of discrete pulse groups to turn on said switch and a duration of each pulse in said first plurality of discrete pulse groups is determined by a first reference signal having a first predetermined voltage,
    wherein in said standby mode, said controller generates a second plurality of discrete pulse groups to turn on said switch and a duration of each pulse in said second plurality of discrete pulse groups is determined by a second reference signal having a second predetermined voltage which is greater than said first predetermined voltage of said first reference signal, and
    wherein said controller further comprises a counter operable for counting a number of said first plurality of discrete pulse groups in said burst mode, and wherein said controller exits said burst mode and enters said standby mode if said number of said first plurality of discrete pulse groups is increased to a predetermined value.

2. The flyback converter of claim 1, wherein said controller exits said burst mode if a duration of a pulse group of said first plurality of pulse groups is greater than a predetermined time.

3. The flyback converter of claim 1, wherein said controller exits said standby mode if a feedback current indicating an output voltage of said flyback converter is less than a first threshold.

4. The flyback converter of claim 3, wherein said controller exits said burst mode if said feedback current is less than a second threshold that is greater than said first threshold.

5. The flyback converter of claim 1, wherein in said burst mode, said controller is enabled to generate a pulse group of said first plurality of discrete pulse groups to turn on said switch if a feedback current indicating an output voltage of said flyback converter is less than a first threshold, and wherein said controller turns off said switch if said feedback current is greater than a second threshold.

6. The flyback converter of claim 5, wherein in said standby mode, said controller is enabled to generate a pulse group of said second plurality of discrete pulse groups to turn on said switch if said feedback current is less than a third threshold, wherein said controller turns off said switch if said feedback current is greater than a fourth threshold, and wherein said third threshold and said fourth threshold are less than said first threshold and said second threshold.

7. A controller for controlling a flyback converter, said controller comprising:
    a first pin operable for receiving a feedback current indicating an output voltage of said flyback converter,
    a second pin operable for receiving a monitoring signal indicating a current flowing through a primary winding of a transformer in said flyback converter; and
    a third pin operable for outputting a drive signal to control a switch coupled in series with said primary winding, said drive signal based on said feedback current and said monitoring signal,
    wherein said controller is configured to operate in a plurality modes, said plurality mode comprising a burst mode and a standby mode,
    wherein in said burst mode, said drive signal comprises a first plurality of discrete pulse groups,
    wherein in said standby mode, said drive signal comprises a second plurality of discrete pulse groups,
    wherein a duration of each pulse in said first plurality of discrete pulse groups is less than a duration of each pulse in said second plurality of discrete pulse groups, and
    wherein in said burst mode, said controller is enabled to generate a pulse group of said first plurality of discrete pulse groups to turn on said switch if said feedback current is less than a first threshold, and wherein said controller turns off said switch if said feedback current is greater than a second threshold.

8. The controller of claim 7, wherein said controller exits said burst mode if a duration of a pulse group of said first plurality of pulse groups is greater than a predetermined time.

9. The controller of claim 7, further comprising:
    a counter operable for counting a number of said first plurality of discrete pulse groups in said burst mode, and wherein said controller exits said burst mode and enters said standby mode if said number of said first plurality of discrete pulse groups is increased to a predetermined value.

10. The controller of claim 7, wherein said controller exits said standby mode if said feedback current is less than a first threshold.

11. The controller of claim 10, wherein said controller exits said burst mode if said feedback current is less than a second threshold that is greater than said first threshold.

12. The controller of claim 7, wherein in said standby mode, said controller is enabled to generate a pulse group of said second plurality of discrete pulse groups to turn on said switch if said feedback current is less than a third threshold, wherein said controller turns off said switch if said feedback current is greater than a fourth threshold, and wherein said third threshold and said fourth threshold are less than said first threshold and said second threshold.

13. A method for controlling a flyback converter in a plurality of modes comprising a burst mode and a standby mode, said method comprising:
    monitoring an output voltage of said flyback converter;
    monitoring a current flowing through a primary winding of a transformer in said flyback converter; and
    generating a drive signal to control a switch coupled in series with said primary winding based on a feedback current indicating said output voltage of said flyback converter and a monitoring signal indicating said current flowing through said primary winding, wherein in said burst mode, said drive signal comprises a first plurality of discrete pulse groups, wherein in said standby mode, said drive signal comprises a second plurality of discrete pulse groups, wherein a duration of each pulse in said first plurality of discrete pulse groups is less than a duration of each pulse in said second plurality of discrete pulse groups, wherein said method further comprises:

counting a number of said first plurality of discrete pulse groups in said burst mode; and exiting said burst mode and entering said standby mode if said number of said first plurality of discrete pulse groups is increased to a predetermined value.

14. The method of claim 13, further comprising:

exiting said standby mode if said feedback current is less than a first threshold.

15. The method of claim 14, further comprising:

exiting said burst mode if said feedback current is less than a second threshold that is greater than said first threshold.

16. The method of claim 13, further comprising:

monitoring a duration of each pulse group of said first plurality of pulse groups; and exiting said burst mode if a duration of a pulse group of said first plurality of pulse groups is greater than a predetermined time.

* * * * *